United States Patent [19]

Murakami et al.

[11] Patent Number: 4,624,621

[45] Date of Patent: Nov. 25, 1986

[54] WRIST MECHANISM FOR INDUSTRIAL ROBOTS AND THE LIKE

[75] Inventors: Tsudoi Murakami; Yasuhide Nagahama, both of Kobe, Japan

[73] Assignee: Kabushiki Kaisha Kobe Seiko Sho, Kobe, Japan

[21] Appl. No.: 511,236

[22] Filed: Jul. 6, 1983

[30] Foreign Application Priority Data

Oct. 21, 1982 [JP] Japan ................................ 57-185824
Feb. 4, 1983 [JP] Japan ............................. 58-15814[U]
Feb. 8, 1983 [JP] Japan ............................. 58-17187[U]
Apr. 5, 1983 [JP] Japan ................................ 58-60420

[51] Int. Cl.⁴ ................................................ B25J 9/06
[52] U.S. Cl. ...................................... 414/735; 901/21; 901/25; 901/28; 901/29; 74/640
[58] Field of Search ................. 414/735, 4; 901/21, 901/25–29, 42; 74/665 R–665 E, 640

[56] References Cited

U.S. PATENT DOCUMENTS

| | | | |
|---|---|---|---|
| 3,108,498 | 10/1963 | James et al. | 901/25 X |
| 4,370,091 | 1/1983 | Gagliardi | 414/4 X |
| 4,392,776 | 7/1983 | Shum | 901/21 X |
| 4,396,344 | 8/1983 | Sugimoto et al. | 901/26 X |
| 4,435,120 | 3/1984 | Ikeda et al. | 901/15 X |
| 4,507,046 | 3/1958 | Sugimoto et al. | 414/735 |
| 4,548,097 | 10/1985 | Zimmer | 414/735 X |

*Primary Examiner*—Robert J. Spar
*Assistant Examiner*—Donald W. Underwood
*Attorney, Agent, or Firm*—Oblon, Fisher, Spivak, McClelland & Maier

[57] ABSTRACT

A flexible wrist mechanism for industrial robots, manipulators and the like, the wrist mechanism having in series two or more wrist articulates each consisting of at least a first wrist element located on a drive side and a second wrist element located on a driven side swingably relative to the first wrist element, characterized in that the wrist mechanism includes a coupling shaft disposed perpendicular to the axes of the first and second wrist elements and connecting the first and second elements pivotally relative to each other; a reducer interposed between the second wrist element and the coupling shaft to restrict the pivoting angle of the second wrist element relative to the first wrist element; and a rotation transfer mechanism rotationally connecting the coupling shafts of adjacent wrist articulates.

24 Claims, 26 Drawing Figures

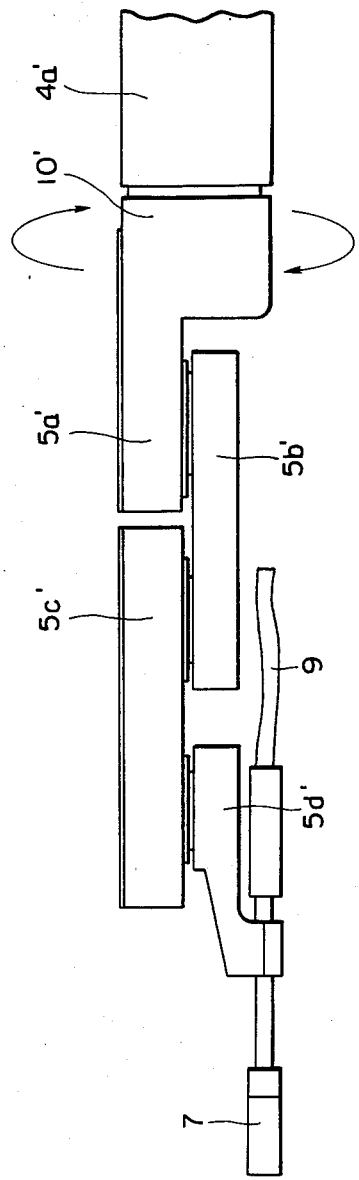
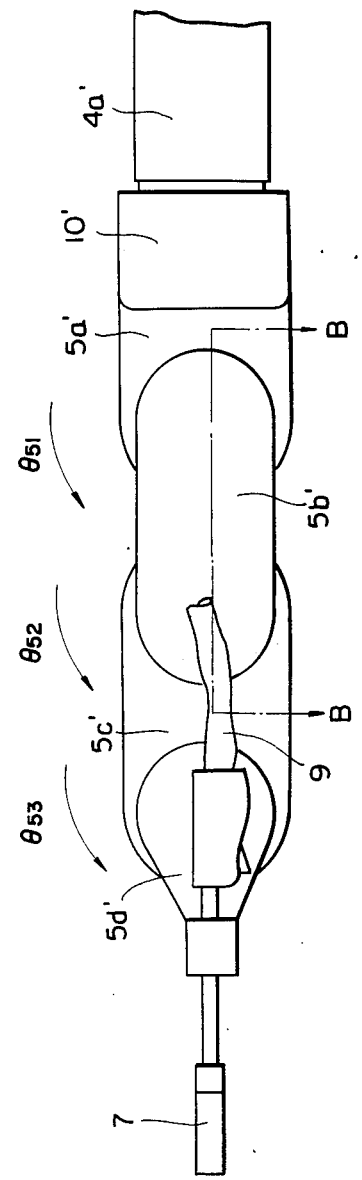
FIGURE 5
FIGURE 6

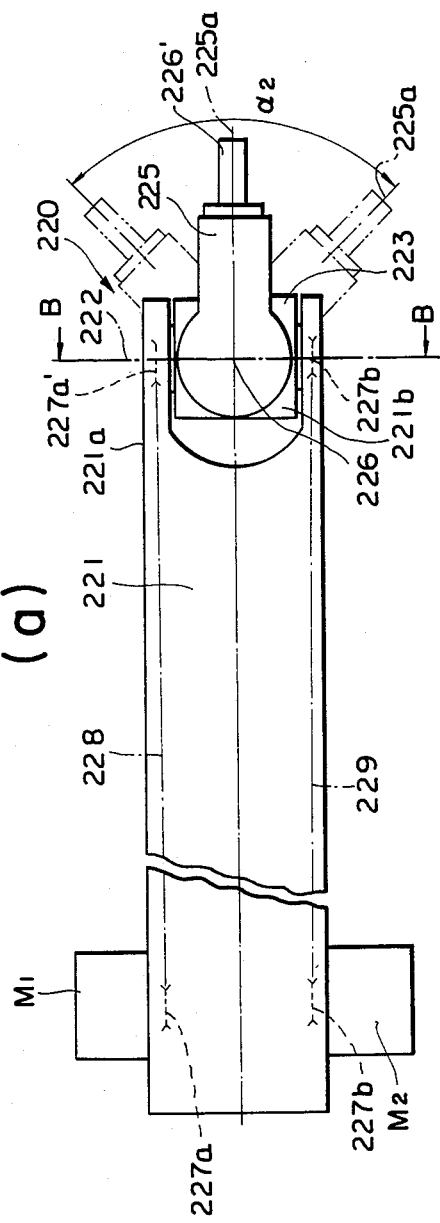

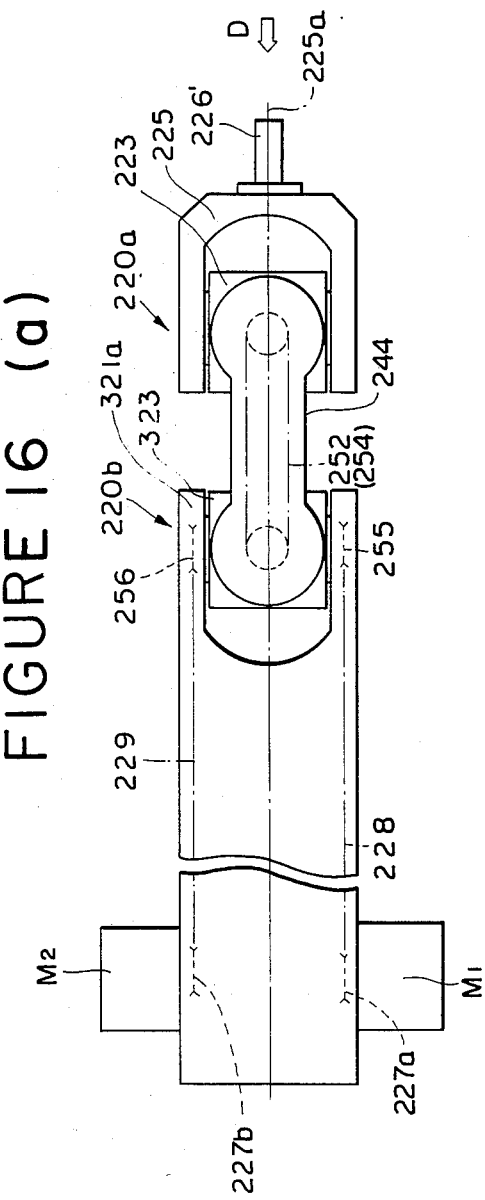
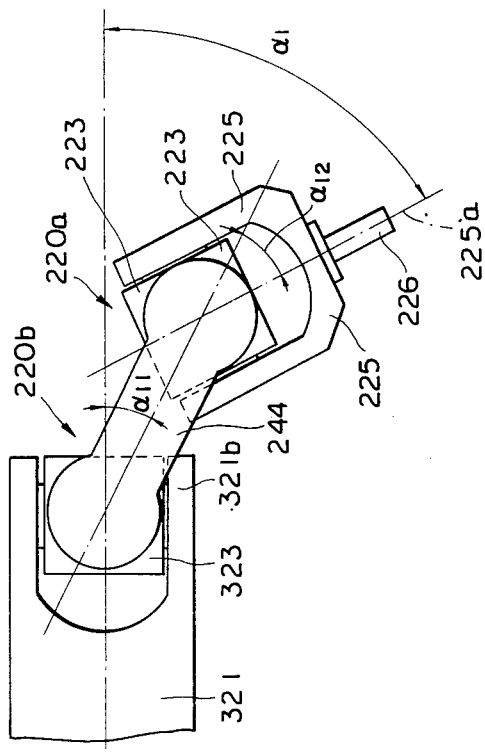
FIGURE 16 (a)
FIGURE 16 (b)

WRIST MECHANISM FOR INDUSTRIAL ROBOTS AND THE LIKE

BACKGROUND OF THE INVENTION

1. Field of the Art

This invention relates to a wrist mechanism useful for industrial robots and manipulators, and more particularly to a flexible wrist mechanism with improved positioning accuracy.

2. Description of the Prior Art

Industrial robots and manipulators for welding and sealing operations are often used in a narrow or limited space, so that a wrist portion which holds a tool is desired to be able to take arbitrary positions or postures and to have a so-called flexible wrist which is freely flexible to ensure the maximum robot application ratio (e.g., the proportion of a robot applicable length in the whole length of a welding line or in the whole sealing length). However, conventional flexible wrist mechanisms in most cases have large play or vibratory motion which are attributable to their construction, and thus are unsuitable for application to operations which require a high degree of accuracy like a welding operation.

SUMMARY OF THE INVENTION

It is therefore an object of the present invention to provide a flexible wrist mechanism with high positioning accuracy and which is suitable for application to industrial robots and manipulators.

It is another object of the present invention to provide a flexible wrist mechanism which permits accurate control of the rotation of the wrist mechanism as a whole and the flexing angles of the respective wrist elements.

It is still another object of the present invention to provide a flexible wrist mechanism further including a rotation transfer means for transmitting rotation to a tool mounting shaft provided at the distal end of the wrist mechanism.

It is a further object of the present invention to provide an articulate mechanism which permits an articulate element on the driven side to swing freely in two perpendicularly intersecting planes to assume arbitrary positions or postures.

According to a fundamental aspect of the invention, there is provided a flexible wrist mechanism for industrial robots, manipulators and the like, the wrist mechanism having in series two or more wrist articulates each consisting of at least a first wrist element located on a drive side and a second wrist element located on a driven side swingable relative to the first wrist element, characterized in that the wrist mechanism comprises: a coupling shaft disposed perpendicular to the axes of the first and second wirst elements and connecting the first and second elements pivotally relative to each other; a reducer interposed between the second wrist element and the coupling shaft to restrict the pivoting angle of the second wrist element relative to the first wrist element; and rotation transfer means rotationally connecting the coupling shafts of adjacent wrist articulates.

The above and other objects, features and advantages of the present invention will become apparent from the following description and the appended claims, taken in conjunction with the accompanying drawings which show by way of example some illustrative embodiments of the invention.

BRIEF DESCRIPTION OF THE DRAWINGS

In the accompanying drawings:

FIG. 5 and 6 are a plan view and a side view respectively, showing a modified form of the wrist mechanism according to the invention;

FIGS. 13(a) and 13(b) are a side view and a plan view respectively, of an articulate mechanism according to the present invention, which is adapted to be driven by a single servo system;

FIGS. 16(a) and 16(b) are plan views of the articulate mechanism of FIG. 15 in non-flexed and flexed states, respectively;

DETAILED DESCRIPTION OF THE PREFERRED EMBODIMENTS

Figure 1:
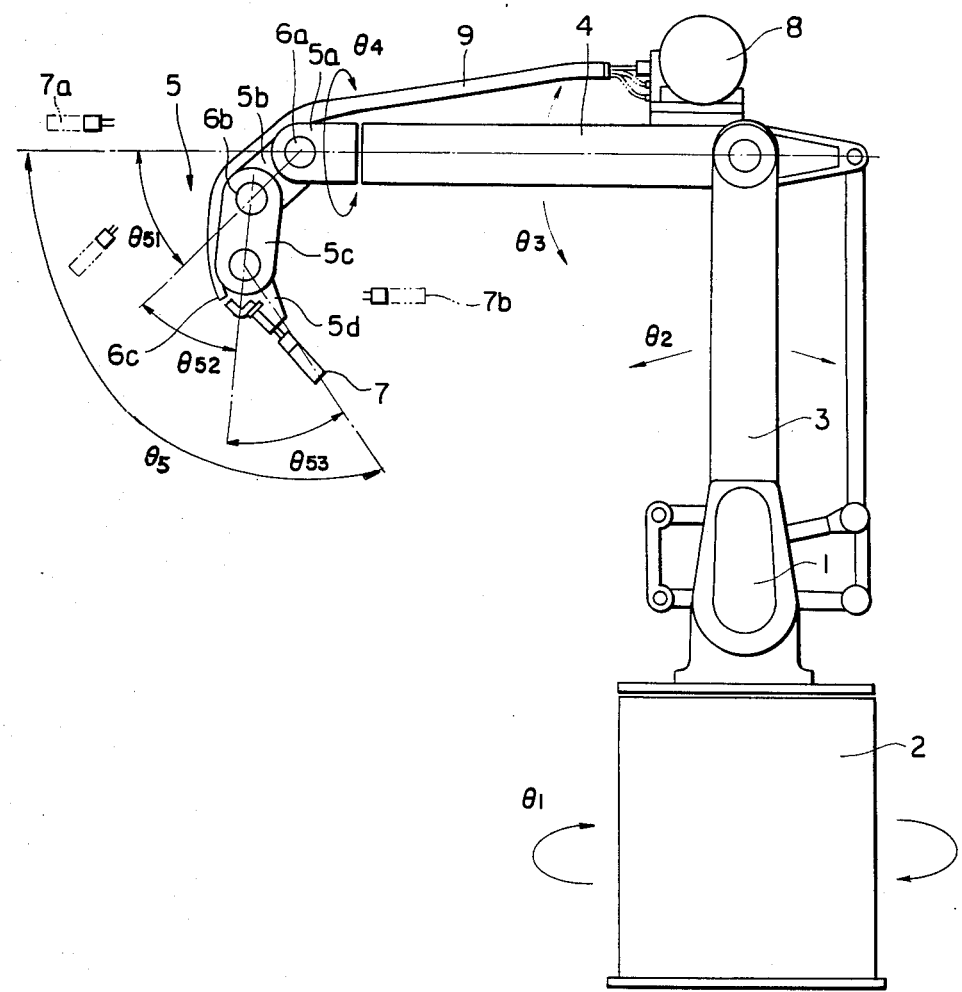
FIG. 1 is a side view of a welding robot incorporating a wrist mechanism according to the present invention.
Figure 2:
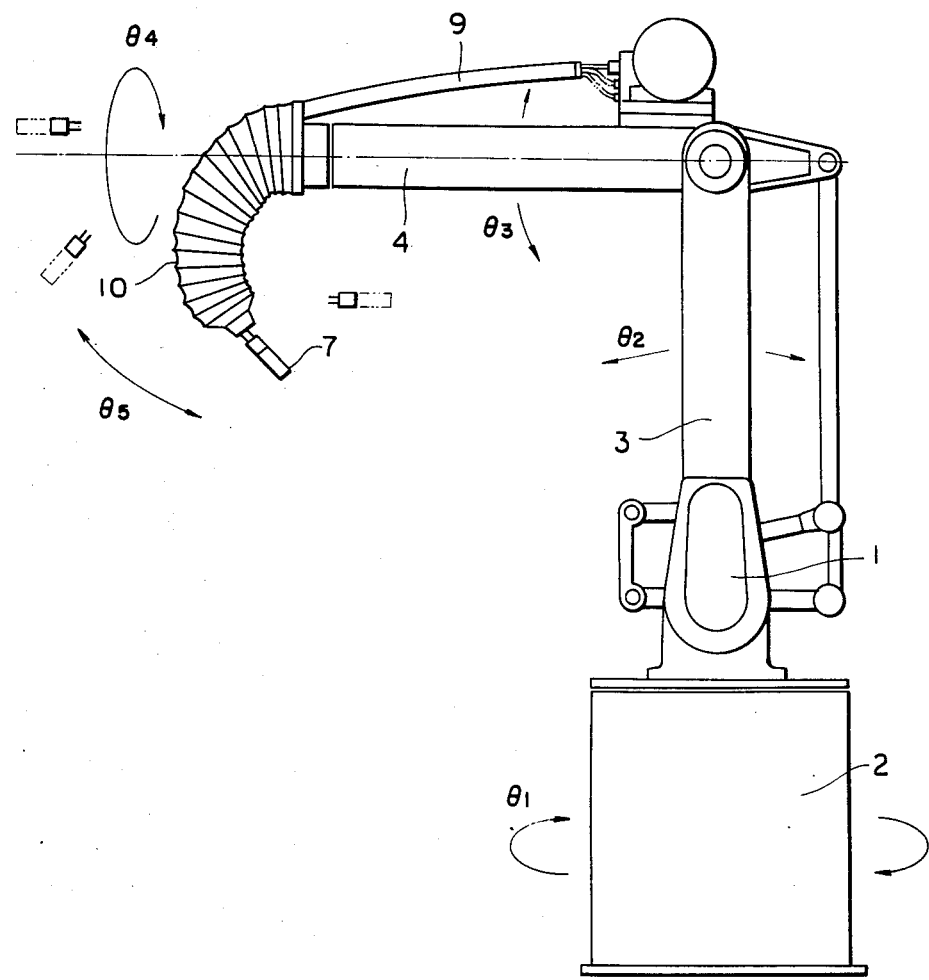
FIG. 2 is a side view of a wrist portion of the robot with a flexible cover fitted thereon.

Referring to the accompanying drawings and first to FIG. 1, there is schematically shown a welding robot which has its main body 1 rotatably mounted on a base 2 for rotation in the direction $\theta_1$. A first arm 3 of the robot is mounted on the main body 1 and is pivotal in the direction $\theta_2$. A flexible wrist mechanism 5 with a freedom of twisting (rotation) in the direction $\theta_4$ is supported at the fore end of a second arm 4 which is in turn mounted at the fore end of the first arm 3 and is pivotal in the direction $\theta_3$. The flexible wrist mechanism 5 is constituted by four wrist elements 5a to 5d which are pivotally connected by three parallel coupling shafts 6a to 6c, the wrist mechanism 5 having as a whole a flexing freedom through an angle $\theta_5$ as resulting from the synthesis of the pivoting angles $\theta_{51}$, $\theta_{52}$ and $\theta_{53}$ of the respective wrist elements. A welding torch 7 is supported at the fore end of the wrist element 5d in the axial direction thereof. If it is preset such that the welding torch is at the position 7a when the angle $\theta_5$ is 0, and if the pivoting angles $\theta_{51}$, $\theta_{52}$ and $\theta_{53}$ are all 60 degrees, the torch is rotatable through 180° into the radially opposite position 7b. Therefore, by the combination of rotations $\theta_4$ and $\theta_5$, it is possible to hold the torch in any posture which is required in welding operations The welding torch 7 and its control unit 8 are connected to each other through a cable 9 which binds a power cable, a conduit cable and a gas hose into a bundle. The wrist portions are preferably wrapped in a flexible cover to protect the cable 9 and wrist mechanism 5 against damage and the intrusion of dust. (See FIG. 2.)

The present invention concerns the wrist mechanism 5 which is provided with a plurality of flexible joints as described above, the construction of which is discussed in greater detail in the following description.

Figure 3:
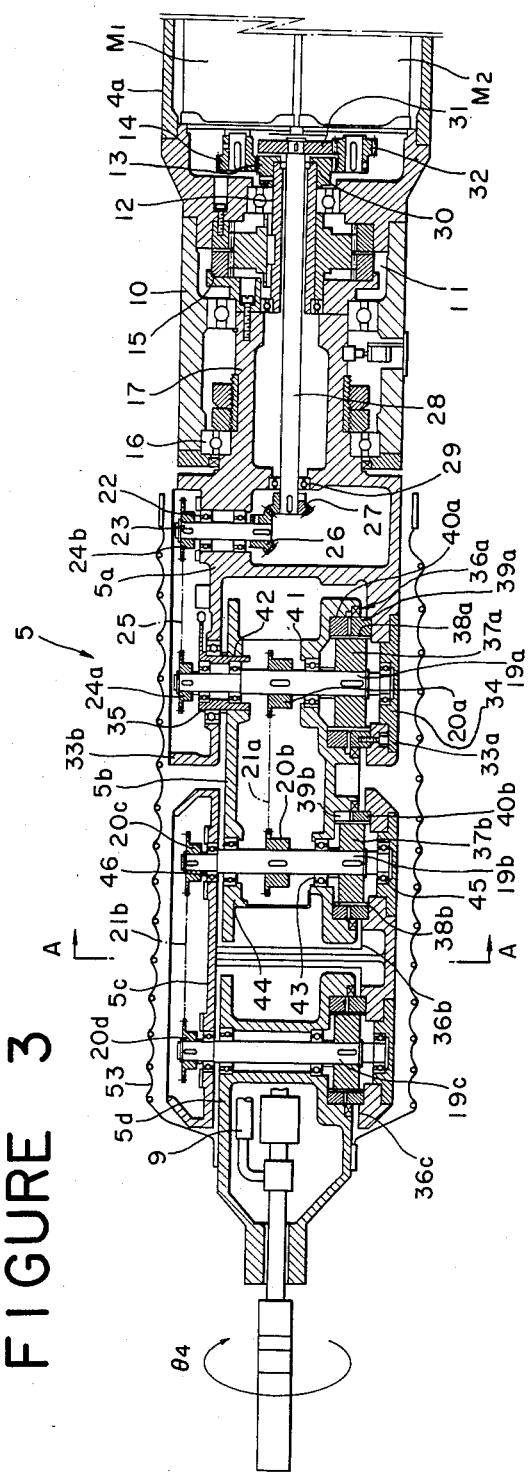
FIG. 3 is a plan view of the wrist mechanism according to the invention.

Referring to FIG. 3, which illustrates the general construction of the wrist mechanism 5, motors M1 and M2, which respectively impart the freedom of rotational motion and the freedom $\theta_5$ of flexing motion to the wrist mechanism 5, are fixedly mounted in the fore end portion 4a of the second arm. Within a casing 10 which is fixed coaxially to the fore end portion 4a, there is provided a harmonic drive reducer 11 (a product of Harmonic, Drive Systems) coaxially with the casing 10. The harmonic drive reducer 11 has a gear 13 meshed with a gear 14 on the output shaft of the motor M1. An outer gear 15 on the driven side of the harmonic drive reducer 11 is coupled with a hollow drive shaft 12. The hollow drive shaft 12 is fastened by screws to a rotational drive shaft 17 which is coaxially and rotatably mounted in the casing 10 through a bearing 16. The rotational drive shaft 17 constitutes a root portion of the wrist mechanism 5 as a whole. That is, the rotational drive shaft 17 is part of the proximal wrist element 5A. The wrist mechanism is imparted with a rotational motion in the direction $\theta_4$ upon turning the rotational drive shaft 17 through the harmonic drive reducer 11 and the hollow drive shaft 12.

Figure 4:
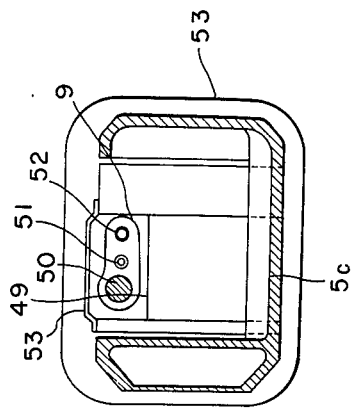
FIG. 4 is a sectional view taken on line A—A of FIG. 3.

On the other hand, the second wrist element 5b is swingable relative to the first wrist element 5a through a coupling shaft 19a which is disposed perpendicular to the axis of the first wrist element. The second wrist element 5b is coupled with the forwardly located third wrist element 5c, which is substantially C-shape in section as shown in FIG. 4, through a coupling shaft 19b. Further, the third wrist element 5c is coupled with the forwardly located fourth wrist element 5d through a coupling shaft 19c. The coupling shafts 19a and 19b are rotated in synchronism by chain sprockets 20a and 20b which are mounted at middle portions of the respective shafts and linked by a chain 21a, while the coupling shafts 19b and 19c are rotated in synchronism by means of chain sprockets 20c and 20d which are mounted on the respective shafts and linked by a chain 21b. Consequently, if the coupling shaft 19a is rotated, the coupling shafts 19b and 19c are rotated at the same speed, provided the respective chain sprockets have the same number of teeth. The coupling shaft 19a is rotated at the same speed with an intermediate shaft 23 which is rotatably mounted on the first wrist element 5a through a bearing 22, by means of chain sprockets 24a and 24b with the same number of teeth which are mounted at one end of the respective shafts and linked by a chain 25. The above-mentioned chain sprocket drives are preferably provided with a tensioner to keep the chain taut. Fixedly mounted at the other end of the intermediate shaft 23 is a bevel gear 26 which is meshed at right angles with a bevel gear 27 at the fore end of a transmission shaft 28. The aforementioned transmission shaft 28 is rotatably supported by a bearing 29 mounted on the first wrist element 5a and a bearing 30 mounted in the drive shaft 12, with a spur gear 31 at its rear end being meshed with a gear 32 which is fixedly mounted on the output shaft of the rocking motor M2.

As will be understood from the foregoing description, the rotation of the motor M1 is transmitted through the gears 14 and 13, drive shaft 12 and harmonic drive reducer 11 to rotate the rotational drive shaft 17 at a reduced speed whereupon, the wrist mechanism 5 which is provided with the first to fourth wrist elements at the fore end of the rotational drive shaft 17 is rotated in the direction $\theta_4$. Further, upon rotating the motor M2, the intermediate shaft 23 and the coupling elements 19a to 19c are rotated at a uniform speed through the gears 32 and 31, transmission shaft 28, and bevel gears 27 and 26.

The rocking movements between the respective wrist elements are achieved by harmonic drive reducers interposed between a coupling shaft and an ensuing wrist element. More particularly, the coupling shaft 19a is journalled through bearings 34 and 35 in bifurcated arms 33a and 33b which are provided at the fore end of the first wrist element 5a, and integrally provided in its intermediate portion with a drive disk 37a of a harmonic drive reducer 36a. The drive disk 37a is meshed with an outer stationary gear 39a and an outer follower gear 40a, through flex spline 38a. The outer follower gear 40a is secured to the second wrist element 5b which is rotatably mounted on the coupling shaft 19a through bearings 41 and 42. Thus, the first and second wrist elements 5a and 5b constitute a flexible joint which permits pivotal movements about the coupling shaft 19a with the first and second wrist elements 5a and 5b on the drive and driven sides, respectively, transmitting the rotation of the coupling element 19a to the second wrist element 5b on the driven side after speed reduction by the harmonic drive reducer 36a to swing the second wrist element 5b at a low speed about the coupling shaft 19a.

In the relation with the third wrist element 5c, the second wrist element 5b constitutes an element on the drive side. Similarly, the third wrist element 5c constitutes an element on the drive side with regard to the fourth wrist element 5d. Rotational movement is transmitted to the elements on the driven side by the same mechanism as in the case of the above-described rotational power transmission from the first to second wrist element through a reducer. The coupling shaft 19b is journalled in the second wrist element 5b through bearings 43 and 44, and supports thereon the third wrist element 5c through bearings 45 and 46, having integrally secured thereto a drive disk 37b of a harmonic drive reducer 36b. The drive disk 37b is meshed with an outer stationary gear 39b secured to the second wrist element 5b through a flex spline and with an outer follower gear 40b secured to the third wrist element 5c.

The third and fourth wrist elements 5c and 5d are in a similar relationship, transmitting the high-speed rotation of the coupling shaft 19c to the fourth wrist element 5d after speed reduction by a harmonic drive reducer 36c which is interposed between the coupling shaft 19c and the fourth wrist element 5d.

Figure 10:
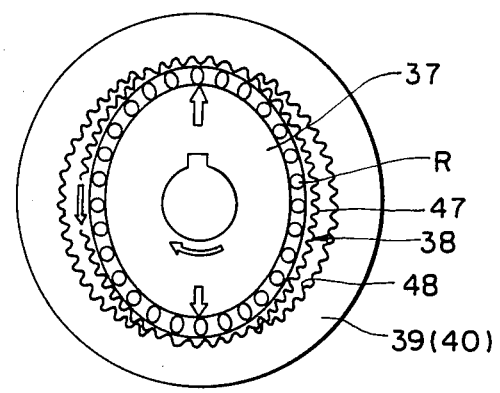
FIG. 10 is a front view of a harmonic drive reducer suitable for use in the wrist mechanism of the invention.

The construction of the aforementioned harmonic drive reducer is diagrammatically shown in FIG. 10. As shown there, a ring-like flex spline 38 of an easily flexible material is intimately fitted around the outer periphery of an elliptic drive disk 37 through a plurality of idle rollers R. The flex spline 38 is provided with a plurality of external teeth 47 around its outer periphery, which are in meshing engagement at the larger diameter portions with internal teeth 48 provided in a true circular form around the inner periphery of the outer stationary gear 39 on the outer side of the flex spline, and are disengaged from the internal teeth 48 in the smaller diameter portions. The external teeth 47 are formed of a number of teeth that is slightly smaller than that of the internal teeth 48 but of the same pitch as the latter. For instance, when the number of the external teeth 47 is 200, the outer gear 39 is provided with 202 internal teeth. The flex spline 38 is further meshed with a driven outer gear 40 which is located side by side with the outer gear 39 on the drive side although not shown in FIG. 10. The number of internal teeth of the outer gear 40 is adjusted to correspond to the number of external teeth of the flex spline 38. More specifically, the internal teeth of the driven outer gear as well as the external teeth of the flex spline 38 are formed such that the external teeth of the flex spline 38 have a slightly larger pitch than the internal teeth of the outer gear 40. Consequently, as the drive disk 37 is rotated, the outer teeth of the flex spline 38 are sequentially engaged with the internal teeth 48 of the stationary outer gear 39, and the flex spline is rotated in the reverse direction to a two-teeth delayed position for every one revolution of the drive disk 37. Since the flex spline 38 and the driven outer gear 40 have the same number of teeth, the outer driven gear 40 is rotated in synchronism with the rotation of the flex spline. Therefore, a single revolution of the drive disk 37 causes the outer driven gear 40 to rotate in the reverse direction by two teeth, effecting a speed reduction of 2/200=1/100. The gear 39 is held stationary and the gear 40 is provided on the driven side in the foregoing description, so that the gear 40 is rotated in a direction reverse to the drive disk 37 at a reduction rate of 1/100. In case the gear 40 is, on the contrary, held stationary, the gear 39 is movable and rotated at the reduced speed in the same direction as the drive disk 37. Consequently, the intermediate shaft 23 and coupling shafts 19a to 19c are rotated at high speed by the rotation of the motor M2. For example, with regard to the coupling shaft 19a and associated parts, the outer follower gear 40a and the second wrist element 5b which is secured to the gear 40a make 0.2 revolution per 20 revolutions of the coupling shaft 19a when the reduction ratio is 1/100, that is to say, the second wrist member is rotated 72 degrees relative to the first wrist member 5a. Upon rotating the coupling shafts 19b and 19c, the third and fourth wrist elements 5c and 5d are rotated in the same direction by a similar angle relative to the second and third wrist elements, respectively. With regard to the rotational movements of and after the second wrist element, however, it is to be noted that the number of revolutions of the coupling shafts 19b and 19c is influenced by the rotational angles of the respective wrist elements so that it is necessary to make corresponding corrections when calculating the final rocking angle of the fourth wrist element 5d. In this manner, the second, third and fourth wrist elements are driven to rotate simultaneously through substantially the same angles, turning the torch 7 at the fore end of the fourth wrist element 5d by the welding angle $\theta_5$ from the horizontal position 7a as shown in FIG. 1.

The cable 9 which is connected to the torch 7 is preferably mounted to extend along the axis of the wrist mechanism if possible in order to avoid interference with the workpiece. Therefore, in the particular embodiment shown, the cable 9 which contains the power cable 50, conduit cable 51 and gas hose 52 is received in an axial groove or recess 49 provided on the upper sides of the respective wrist elements as illustrated in FIG. 4, closing the groove 49 with a cover 53 if necessary. Further, it is preferred that the wrist mechanism 5 be wrapped as a whole in a flexible cover 53 as shown in FIG. 3 to thereby reduce noise and to prevent dust deposition therein.

Figure 7:
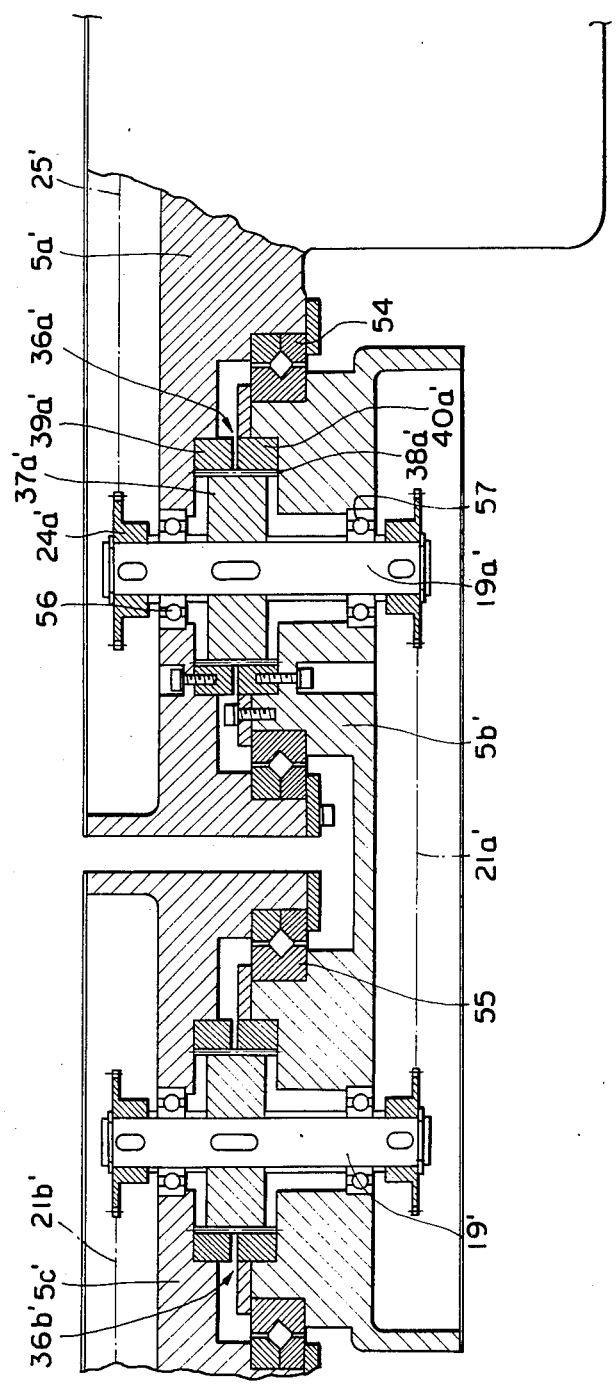
FIG. 7 is a sectional view taken on line B—B of FIG. 6.

Although the respective coupling shafts are all supported at both ends in the foregoing embodiment, a cantilever type support structure may be employed as in the modification shown in FIGS. 5 to 7. More specifically, as shown particularly in FIG. 7, the first and second wrist elements 5a' and 5b' are swingably connected by cross roller bearings 54, while the third and furth wrist elements 5c' and 5d' are swingably connected by cross roller bearings 55, with the second wrist element 5b' located on one side of the first and third wrist elements 5a' and 5c'. The coupling shaft 19a' is journalled in bearings 56 and 57 which are mounted on the first and second wrist elements 5a' and 5b', respectively, and is integrally formed with the drive disk 37a' of the harmonic drive reducer 36a'. The drive disk 37a' is meshed through flex spline 38a' with the outer stationary gear 39a' fixed to the first wrist element 5a', and with the outer driven gear 40a' secured to the second wrist element 5b'. The high speed rotation of the coupling shaft 19a' which is transmitted by a chain 25' and a sprocket 24a' at one end of the coupling shaft 19a' is reduced by the harmonic drive reducer 36a' to rotate at low speed the outer driven gear 40a' and the second wrist element 5b' which is integrally secured to the gear 40a'. The coupling shaft 19a' is linked by a chain 21a' to the coupling shaft 19b' which couples the second and third wrist elements 5b' and 5c' with each other. The coupling shaft 19b' is linked by a chain 21b' to the foremost coupling shaft (not shown). The manner of coupling the second and third wrist elements 5b' and 5c' and the construction of the interposed harmonic drive reducer 36d' are the same, and hence further description in this regard is omitted to avoid redundancy.

Figure 8:
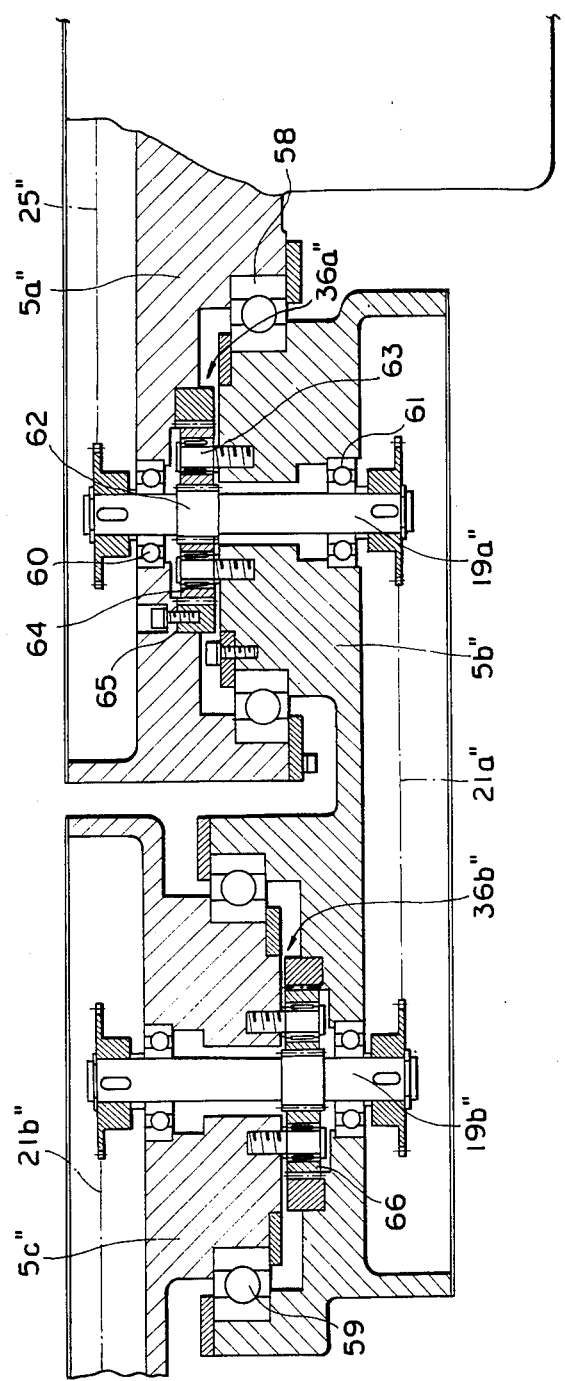
FIG. 8 is a view similar to FIG. 7 but showing another form of the wrist mechanism according to the invention.
Figure 9:
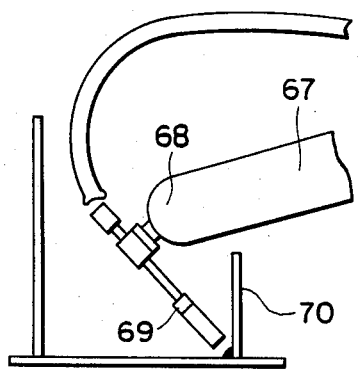
FIGS. 9(a) and 9(b) are side views showing a wrist mechanism of a conventional welding robot in operation.
FIGS. 9(c) and 9(d) are side views showing the wrist mechanism of the present invention in similar welding operation.
Figure 9:
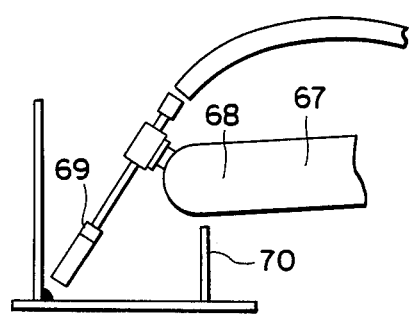
Figure 9:
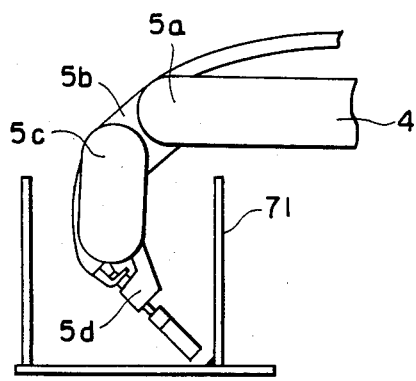
Figure 9:
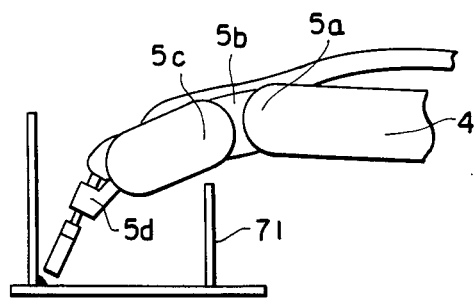

The reducer to be used in the present invention is not limited to the above-described harmonic drive reducer, and may instead be a planetary gear reducer or a planetary roller reducer. FIG. 8 shows in fragmentary section a wrist mechanism using planetary gear reducers 36a'' to 36c''. In FIG. 8, the first wrist element 5a'' is rockably coupled with the second wrist element 5b'' through a bearing 58, and the second wrist element 5b'' is similarly rockably coupled with the third wrist element 5c'' through a bearing 59. A coupling shaft 19a'' which is mounted coaxially with the bearing 58 is rotatably supported in bearing 60 on the part of the first wrist element 5a" and a bearing 61 on the part of the second wrist element 5b". A gear 62 which is formed in the middle portion of the coupling shaft 19a" in turn is meshed with a planetary gear 64 which is rotatably mounted on a pin 63 threaded into the second wrist element 5b". The planetary gear 64 is meshed with the inner side of an outer gear 65 fixed to the first wrist element 5a". Therefore, if the coupling shaft 19a" is rotated by the chain 25" with the first wrist element 5a" in fixed state, the planetary gear 64 which is meshed with both the gear 62 and the outer gear 64 is revolved about its axis and at the same time turned around the coupling shaft 19a" at a reduced speed to turn the second wrist element 5b" about the coupling shaft 19a" at a low speed. The same principles apply to the coupling shaft 19b" which is rotated in synchronism with the coupling shaft 19a" by a chain 21a" and the planetary gear 66 which meshed with the coupling shaft 19b". That is to say, rotation of the coupling shaft 19b" causes the third wrist element 5c" to rotate at a low speed relative to the second wrist element 5b". In this manner, the rotation of the coupling shafts which are linked by chains is transmitted to a wrist element of a succeeding stage at a reduced speed to rock each wrist element substantially by the same angle.

The chains which are employed in the foregoing embodiments to transmit rotations to the respective coupling shafts may be replaced by other transmission means such as belts and wires. Further, although the sprockets for driving such transmission means has been shown as having the same number of teeth, it is possible to change the number of teeth or the reduction ratio of the reducer which is mounted on an adjacent coupling shaft, to thereby vary the rocking angle of the wrist element on the driven side from that of the wrist element on the drive side.

Figure 11:
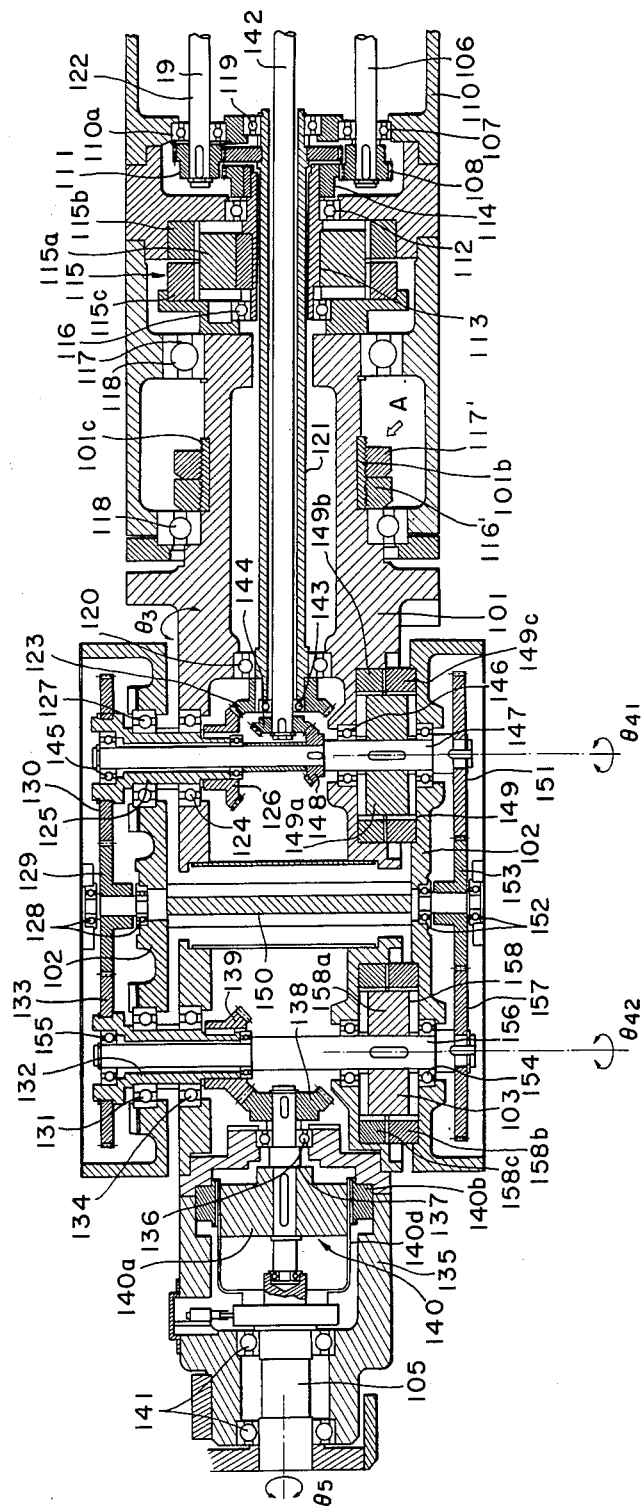
FIG. 11 is a horizontal section of another embodiment of the invention.

Referring to FIG. 11, there is shown another embodiment of the wrist mechanism according to the present invention, further incorporating a second rotation transfer means for rotating a tool mounting shaft at the distal end of the wrist mechanism.

In FIG. 11, indicated at 106 is a shaft which is coupled with an arm rotating motor M₁ and rotatably supported on a second arm 110 through a bearing 107 mounted at the fore end thereof. A gear 108 is mounted at the fore end of the shaft 106. Indicated at 109 is a rotational shaft which is coupled with a swing drive motor M2 for imparting rotational movement to a tool mounting shaft 105, the shaft 109 being rotatably supported in a bearing 110a provided at the fore end of the second arm 110 and provided with a gear 111 at its fore end. The gear 108 is meshed with a gear 114 which is fixedly mounted at one end of a hollow shaft 113 which is in turn supported on the second arm 110 through bearing 112. Fixedly mounted on the hollow shaft 113 is a drive disk 115a of a harmonic drive reducer 115 which has its stationary outer gear 115b secured to the second arm side and driven outer gear 115c securely fixed to a rotation transmission disk 117 which in turn is rotatably supported on the hollow shaft 113 through a bearing 116. The rotation transmission disk 117 is fixed to a first wrist element 101 rotatably supported on the second arm 110 through a bearing 118.

The gear 111 which is mounted on the shaft 109 is meshed with a gear 122 fixedly mounted in an end portion of a hollow shaft 121 fitted coaxially in the hollow shaft 113 which in turn is rotatably supported on the second arm by bearings 119 and 120. A bevel gear 123 which is mounted at the other end of the hollow shaft 121 is meshed perpendicularly with a bevel gear 126 fixedly mounted at the inner end of a hollow transmission shaft 125 rotatably supported on the first wrist element 101 through a bearing 124.

An intermediate gear 129 is rotatably supported at opposite sides thereof by bearings 128 mounted in a center portion of a second wrist element 102 which rockably mounted on the hollow shaft 125 through a bearing 127. This intermediate gear 129 is meshed with a gear 130 fixedly mounted at the outer end of the transmission shaft 125 to form part of a second rotation transmission means.

A hollow transmission shaft 132 which is rotatably mounted on the second wrist element 102 through a bearing 131 in parallel relation with the transmission shaft 125 has a gear 133 fixedly mounted at its outer end to form part of the second rotation transmission means. The gear 133 is meshed with the above-mentioned intermediate gear 129. Both of the transmission shafts 125 and 132 are disposed perpendicular to the axes of the respective wrist elements.

A third wrist element 103 which is rotatably supported at one end by the transmission shaft 132 through a bearing 134 is integrally provided with a fore extension 135 at its fore end. A bevel gear 138 fixedly mounted at the rear end of a shaft 137, which is rotatably supported on the fore extension 135 through a bearing 136, is perpendicularly meshed with a bevel gear 139 fixedly mounted at the inner end of the transmission shaft 132. The fore extension 135 of the third wrist member 103 accommodates therein a harmonic drive reducer 140, and the shaft 137 is integrally provided with the drive disk 140a of the harmonic drive reducer 140. A flex spline 140d interposed between a stationary outer gear 140b fixedly mounted on the fore extension 135 and the drive disk 140a is connected at its front end to a tool mounting shaft 105 which is supported on the fore extension 135 through bearings 141.

On the other hand, a shaft 142 connected to a wrist flexing motor M3 (not shown) is rotatably supported at its fore end portion in a bearing 143 provided around the inner periphery of the bevel gear 123 which is fixedly mounted on the hollow shaft 121, and fixedly provided with a bevel gear 144 at its fore end. The bevel gear 144 is perpendicularly meshed with a bevel gear 148 mounted in a center portion of a coupling shaft 147 which has its one end supported by the transmission shaft 125 through a bearing 145 and the other end rotatably supported in a bearing 146 on the first wrist member 101. As shown in FIG. 11, the coupling shaft 147 is coaxially fitted in the hollow transmission shaft 125, perpendicular to the axis of the first wrist element 101. The coupling shaft 147 mounts fixedly in its middle portion a drive disk 149a of a harmonic drive reducer 149 which has its outer stationary gear 149b securely fixed to the first wrist element 101 and its outer driven gear 149c to the second wrist element 102. The second wrist element 102 has side portions which extend on opposite sides of the first and third wrist elements 101 and 103 and which are connected by a rib 150.

The coupling shaft 147 is provided at one end (the end remote from the transmission shaft 125) with a gear 151 which forms part of the first transmission means. The gear 151 is meshed with an intermediate gear 153 which is rotatably supported at opposite ends on the second wrist element 102 by bearings 152. The intermediate gear 153 is meshed with a gear 157 provided at the fore end of a coupling shaft 156 which has its one end rotatably supported on the second wrist element 102 through a bearing 154 and the other end rotatably supported by the transmission shaft 132 through bearing 155. The coupling shaft 156 is integrally provided with a drive disk 158a of a harmonic drive reducer 158 which is fitted between the second and third wrist elements. The harmonic drive reducer 158 has its stationary outer gear 158b securely fixed to the second wrist element 102 and its driven outer gear 158c to the third wrist element 103.

The wrist mechanism of FIG. 11 is imparted with rotational and flexing movements in the following manner. Upon rotating the motor M1, its rotation is transmitted to the hollow shaft 113 through the gears 108 and 114 to thereby rotate the outer driven gear 115c of the harmonic drive reducer 115 at a reduced speed according to the number of revolutions of the hollow shaft 113. Consequently, the first wrist element 101 which is fixed to the outer driven gear 115c through the rotation transmission disk 117 is rotated at a reduced speed about the shaft 142, turning about the shaft 142 the whole wrist mechanism 104 including the first and the following wrist elements.

On the other hand, if the shaft 109 is rotated by the motor M2, its rotation is transmitted to the hollow shaft 121 through the gears 111 and 122, and then to the bevel gear 126 which is meshed with the bevel gear 123 on the hollow shaft 121, rotating at a high speed the transmission shaft 125 which is integrally secured to the bevel gear 126. The rotation of the transmission shaft 125 is further transferred to the other transmission shaft 132 through the gears 130, 129 and 133 and then through the bevel gears 139 and 138 to rotate the shaft 137. The rotation of the shaft 137 is transmitted to the harmonic drive reducer 140 to rotate at a reduced speed the tool mounting shaft 105 which is securely fixed to the flex spline 140d of the harmonic drive reducer 140.

Further, upon rotating the shaft 142 by starting the motor M3 (not shown), its rotation is transmitted to the coupling shaft 147 through the gears 144 and 148, and simultaneously to the coupling shaft 156 through the gears 151, 153 and 157 as mentioned hereinbefore. By the rotation of the coupling shaft 147, the drive disk 149a of the harmonic drive reducer 149 is rotated and, after speed reduction, its rotation is transmitted to the third wrist element 103 to flex the second and third wrist elements 102 and 103 in the same direction by angles $\theta_{41}$ and $\theta_{42}$. As a result, the third wrist element 103 and the tool mounting shaft 105 which is accommodated in the third wrist element 103 are flexed by angle $\theta_5$ relative to the second arm 110 of the robot. In this manner, the wrist mechanism 104 as a whole is rotated about the axis of the second arm 110 by the rotation of the shaft 106, while simultaneously the tool mounting shaft 105 is rotated about the axis of the third wrist element 103 by the rotation of the shaft 109 irrespective of the movement of the wrist mechanism 104, and the second and third wrist elements are respectively swung or flexed in the same direction relative to the first wrist element by the rotation of the shaft 142. Since the driven parts in these drive lines are all directly coupled with the respective reducers, they are free of the adverse effects of vibrations or irregularities in rotation occurring upstream of the reducers and thus they can guarantee a remarkably improved positioning accuracy.

Of course, it is possible to employ planetary gear reducers or planetary roller reducers instead of the harmonic drive reducers. The gears 130, 133, 151, 153 and 157 which serve as the first and second rotation transmission means may be replaced by chains or timing belts or other rotation transmission means if desired. Further, the bevel gears 144 and 148 as well as the bevel gears 139 and 138 which are employed as meshing transmission means may be substituted by a spherical joint or a combination of a worm and a worm wheel.

Figure 12:
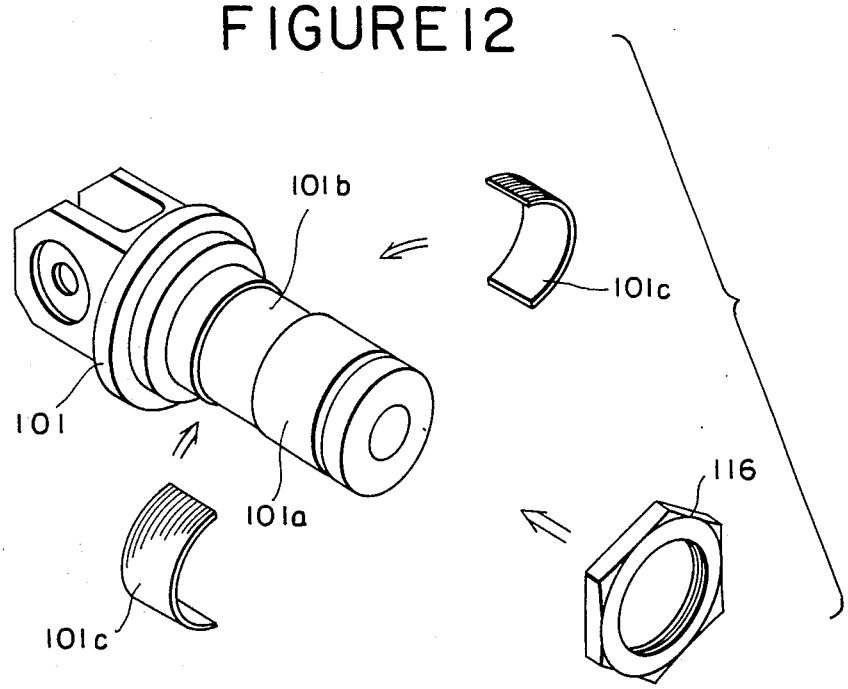
FIG. 12 is an exploded view of a shaft portion of a first wrist element, taken in the direction of arrow A of FIG. 11.

In the embodiment shown in FIG. 11, the first wrist element 101 is rotatably supported through the first arm 112' and bearing 118 which is fixed in position by means of a nut 116' which is threaded on the first wrist element 101. When threading a nut on a shaft in this manner, it is the general practice to tap a male screw on the shaft itself in spite of the increase in the number of steps of the machining process. With a first wrist element of the construction shown in FIG. 11, it is preferrable to provide an annular groove 101b on the circumference of the shaft portion 101a of the first wrist element 101 as shown in FIG. 12, fitting the segments 101c of a hollow split bolt in the annular groove 101b and fastening thereon a thin-wall nut 116' for fixing the bearings 118. A double nut 117' serves to prevent loosening of the nut 116'. With this construction, it suffices to cut the groove 101b in the machining process of the shaft portion of the first wrist element, and it is possible to produce the hollow bolt 101c on a large scale according to the diameter of the shaft portion for lowering its production cost.

Figure 14:
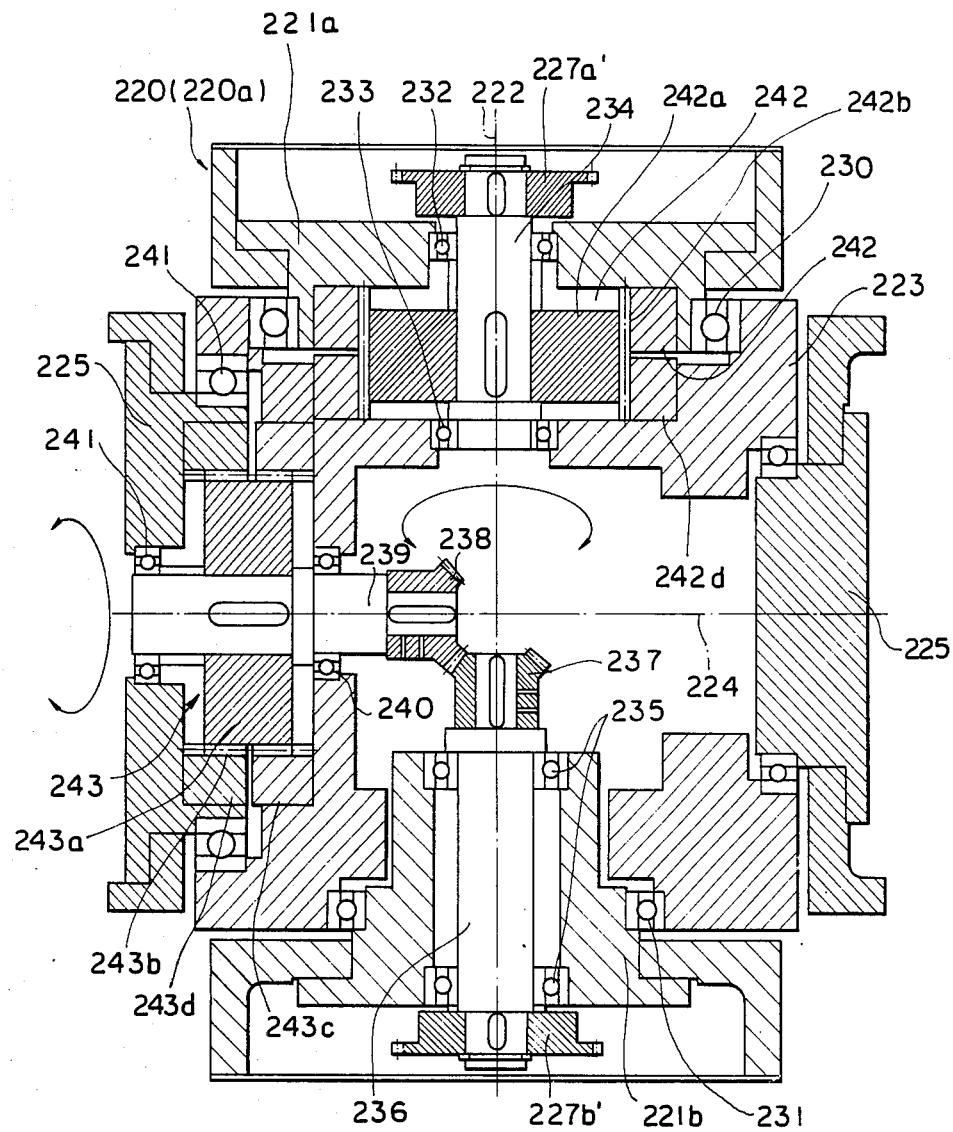
FIG. 14 is a sectional view taken on line B—B of FIG. 13(a)

Referring to FIGS. 13 and 14, there is shown an articulate mechanism which is suitable for use at the joint between a wrist mechanism and a supporting arm or at the joints of other robot elements and which permits an articulate element on a driven side to swing freely in two perpendicularly intersecting planes to assume arbitrary positions or postures without rotating the wrist mechanism itself. As shown in FIGS. 13(a) and 13(b), the joint mechanism 220 is mounted at the fore end of a robot arm 221 with bifurcated portions 221a and 221b which serve as articulate elements on the drive side. An articulate member 223 is rotatably supported between the bifurcated portions 221a and 221b about a transverse axis 222. Indicated at 225 is an articulate element, which is mounted astride of the articulate member 223 and swingable about an axis 224 perpendicular to the transverse axis 222. By rotation about the axes 222 and 224, the articulate element 225 on the driven side can be pivoted about the point of intersection 226 of the axes 222 and 224 to flex same in arbitrary directions. In this instance, the articulate element 225 on the driven side represents the foremost member of the wrist which is, in the case of a welding robot, provided with a tool mounting shaft 226' for holding a welding torch.

The pivotal movement of the driven articulate element 225 about the axis 224 and in the direction of $\alpha_1$ of FIG. 13(b) is effected by transmitting the rotation of a motor M1 which is mounted on the arm 221, through a chain sprocket 227a, a chain 228 and a chain sprocket 227a. On the other hand, the pivotal movement of the driven articulate element 225 about the axis 222 and in the direction of $\alpha_2$ of FIG. 13(a) is effected by transmitting the rotation of a motor M2 which is mounted on the arm 221 on the side away from the motor M1, through a chain sprocket 227b, a chain 229 and a chain sprocket 227b.

FIG. 14 shows a rotational mechanism which imparts the above-mentioned pivoting movements to the articulate element 225 on the driven side. In FIG. 14, the bifurcated portions 221a and 221b which are formed at the fore end of the arm 221 to serve as articulate elements on the driving side support therebetween the aforementioned articulate member 223 through bearings 230 and 231 pivotally about the transverse axis 222. By the bifurcated portion 221a and bearings 232 and 233 which are mounted on the articulate member 223, a first drive shaft 234 is rotatably supported perpendicularly to the axis of the arm 221. (See FIG. 13(a). The chain sprocket 227a' is fixedly mounted at the fore end of the first drive shaft 234. On the other hand, a second drive shaft 236 is rotatably supported on the bifurcated portion 221b through bearings 235 and 235' in coaxial relation with the first drive shaft 234, and the chain sprocket 227b' is fixedly mounted at the fore end of the second drive shaft 236. Therefore, the articulate member 223 is rotatably supported on the bifurcated portions 221a and 221b through and coaxially with the first and second drive shafts 234 and 236 for pivoting movement about these shafts.

A bevel gear 237 which is provided at the distal end of the second drive shaft 236 to serve as part of a second rotation transmission means is meshed perpendicularly with a bevel gear 238 which is mounted at the opposing end of a second transmission shaft 239. The second transmission shaft 239 is rotatably supported perpendicular to the first and second drive shafts 234 and 236 by a bearing 240 provided on the articulate member 223 and a bearing 241 provided on the driven articulate element 225. Interposed between the first drive shaft 234 and the articulate member 223 is a first reducer 242 which consists of, for example, a harmonic drive reducer having its drive disk 242a fixedly secured to the first drive shaft 234 and coupled through a flex spline 242b with an outer gear 242c fixed to the bifurcated portion 221a and an outer gear 242d fixed to the articulate member 223, for transmitting the rotation of the first drive shaft 234 to the articulate member 223 after speed reduction by the first reducer 242.

Mounted between the second transmission shaft 239 and the driven articulate element 225 is a second reducer 243 similar to the first reducer 242. The drive disk 243a of the second reducer 243 is securely fixed to the second transmission shaft 239 and coupled through a flex spline 243b with a stationary outer gear 243c secured to the articulate member 223 and a driven outer gear 243d secured to the driven articulate element 225. Therefore, as the second transmission shaft 239 is rotated, its rotation is transmitted to the driven articulate element 225 after speed reduction by the second reducer 243.

Namely, as illustrated in FIGS. 13(a), 13(b) and 14, upon rotation of the chain sprocket 227a by driving the chain 228 from the motor M1, the first drive shaft 234 is also put in high-speed rotation and it is transmitted to the articulate member 223 after speed reduction by the first reducer 242, flexing about the axis 222 the articulate member 223 and the driven articulate element 225 which is mounted on the articulate member 223 through bearing 241.

If the chain 229 is driven by the motor M2 to rotate the chain sprocket 227b' at high speed, the second drive shaft 236 is rotated integrally with the chain sprocket 227b' and its rotation is transmitted to the second transmission shaft 239 through the bevel gears 237 and 238 which constitute the second rotation transmission means. The rotation of the second transmission shaft 239 is transferred to the articulate element 225 on the driven side after speed reduction by the second reducer 243, pivoting the driven articulate element 225 about the axis 224.

Therefore, if forward and reverse rotation of the motors M1 and M2 are repeated in terms of a trigonometric function and at the same synchronized frequencies, the driven articulate element 225 undergoes precessional rotation about the pivotal point 226 (see FIGS. 13(a) and 13(b)). Accordingly, the driven articulate element 225 and the tool mounting shaft 226' can be put in arbitrary postures by controlling the rotational angles of the motors M1 and M2.

Figures 15A, 15B:
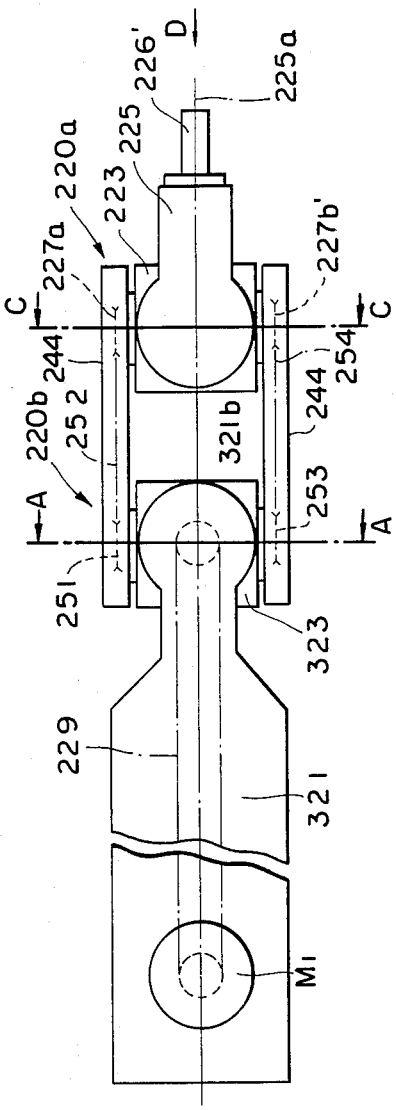
FIGS. 15(a) and 15(b) are side views of an articulate mechanism adapted to drive two or more articulates by a single servo system, showing the mechanism in a non-flexed state in FIG. 15(a) and in a flexed state in FIG. 15(b)
Figure 17:
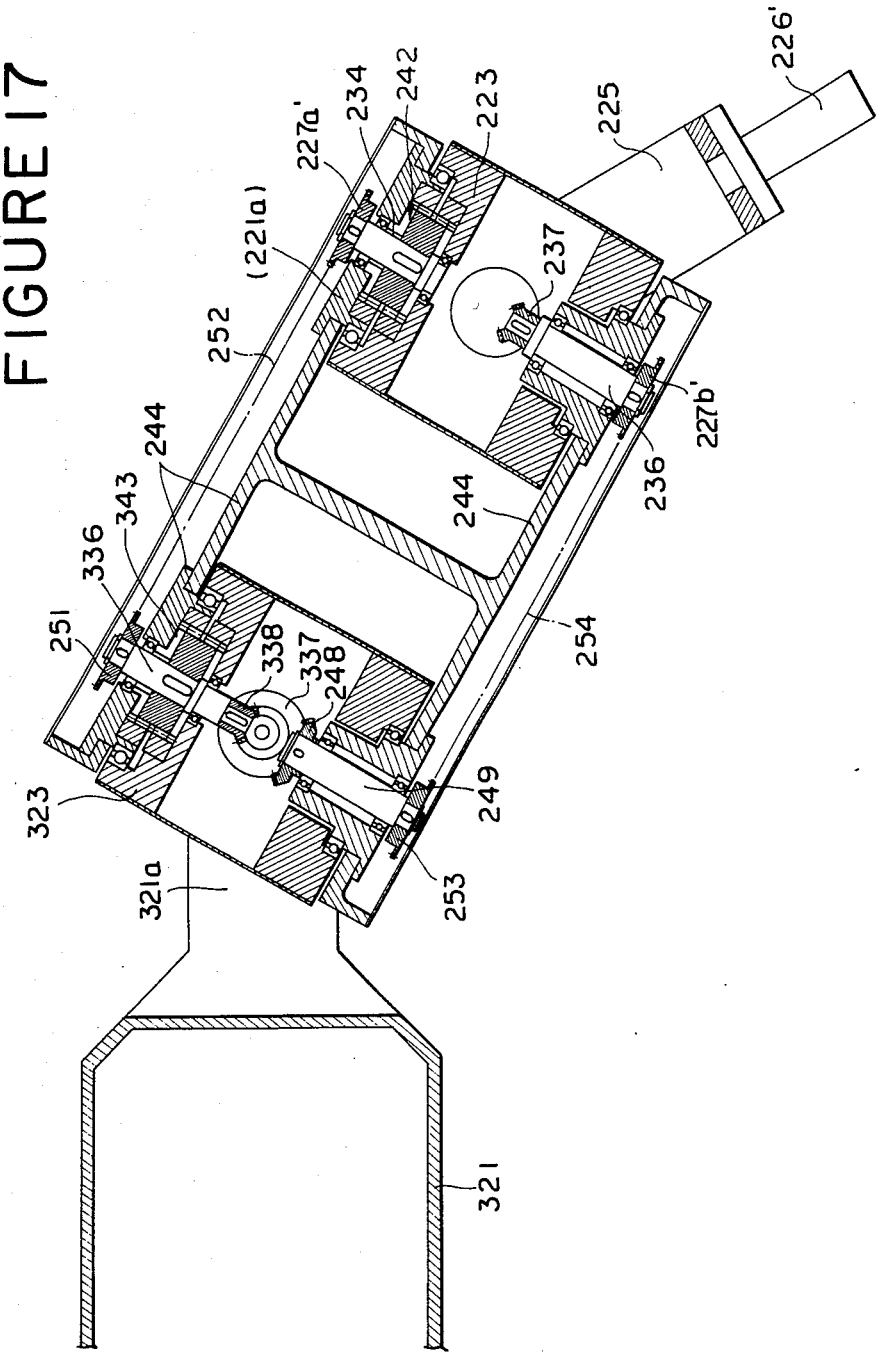
FIG. 17 is a longitudinal section of the flexed articulate mechanism of FIG. 15(b)
Figure 18:
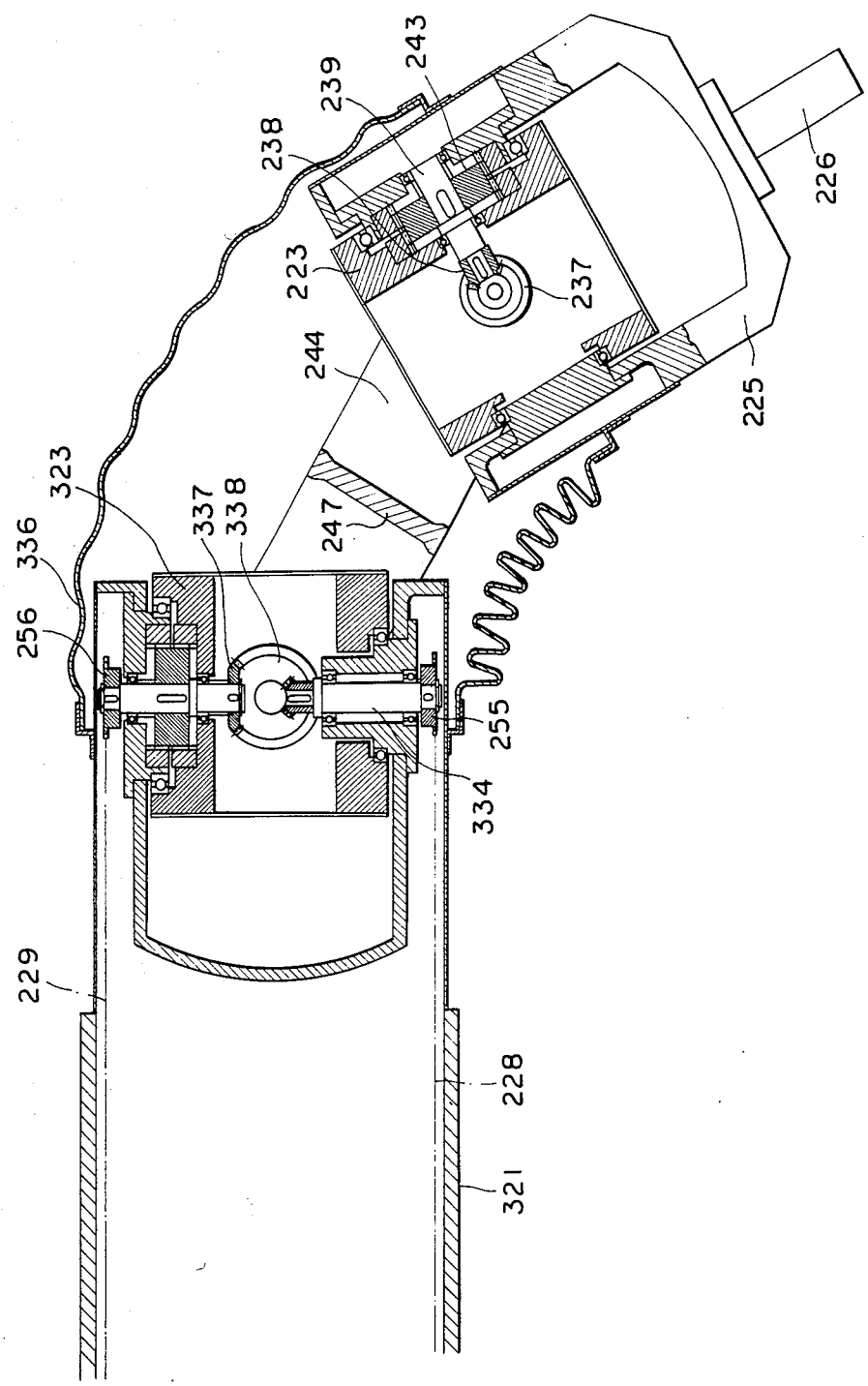
FIG. 18 is a longitudinal section of the flexed articulate mechanism of FIG. 16(b)
Figure 19:
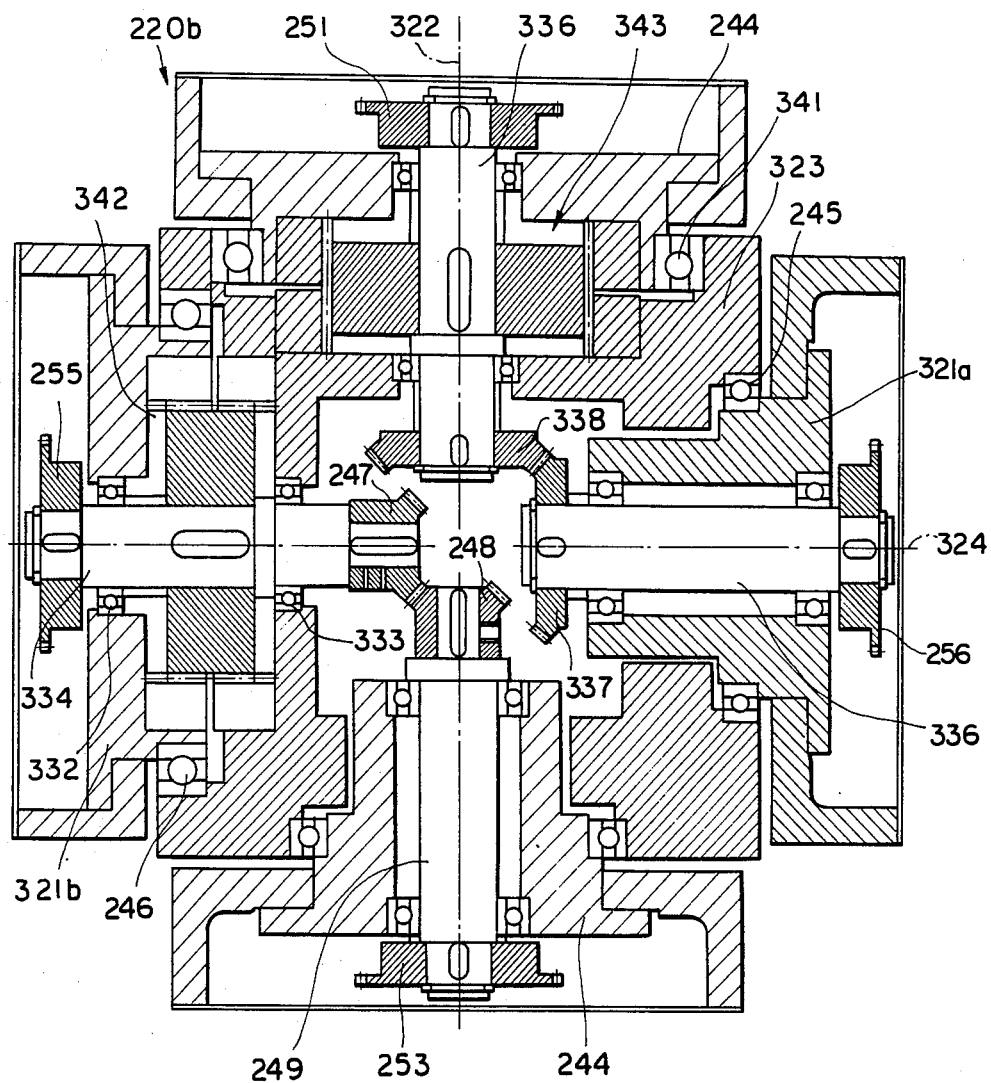
FIG. 19 is a sectional view taken on line A—A of FIG. 15(a)

FIGS. 15 and 16 show an embodiment employing a pair of the above-described articulate mechanism which are connected by a link member 244. Two or more articulate mechanisms can be simultaneously flexed by the motors M1 and M2 by addition of a rotation transmission mechanism. More specifically, in the embodiment of FIGS. 15 and 16 employing a couple of articulate mechanisms, namely, a fore articulate mechanism 220a and a rear articulate mechanism 220b which are connected by a link member 244, the fore articulate mechanism 220a is the same in construction as the mechanism 220 of FIG. 14, and therefore its component parts are designated by similar reference numerals. The rear articulate mechanism 220b consists of the articulate mechanism 220 of FIG. 14 and a rotation transmission mechanism as shown in FIG. 19 for transmitting the rotational force to the fore articulate mechanism 220a. The link member 244 corresponds to the bifurcated portions 221a and 221b relative to the fore articulate mechanism 220a and to the driven articulate element 225 of FIG. 13 relative to the rear articulate mechanism 220b.

Namely, in the sectional view of the rear articulate mechanism 220b of FIG. 19, indicated at 321a and 321b are the bifurcated portions at the fore end of the robot arm shown in FIGS. 13 and 14, supporting therebetween an articulate member 323 through bearings 245 and 246 for rotation about an axis 324. Through a second reducer 343 consisting of a harmonic drive reducer or the like, the articulate member 323 is coupled with a second transmission shaft 339 which is rotatable about an axis 322. The second transmission shaft 339 is perpendicularly coupled with a second drive shaft 336 which is supported on the bifurcated portion 321a rotatably about the axis 324, through bevel gears 337 and 338 which constitute the second rotation transmission means.

The link member 244 which is pivotally mounted on the articulate member 323 through bearing 341 for rocking movement about the axis 322 is coupled with the second drive shaft 336 through the second reducer 343. The first drive shaft 334 which is rotatably supported on the other bifurcated portion 321b through bearing 332 for rotation about the axis 324 is coupled with the above-mentioned articulate member 323 through the first reducer 342 which is mounted on the bifurcated portion 321b.

As is clear from the foregoing description, the articulate mechanism 220b has substantially the same construction as the articulate mechanism 220 (220a) of FIG. 14, but differs from the latter in that the bevel gear 247 of the first rotation transmission means is fixedly mounted at the end of the first drive shaft 334 and in that the first transmission shaft 349 with the bevel gear 248 at the end thereof for perpendicularly meshing with the bevel gear 247 is rotatably supported through bearings 250, 250' on the link member 244 on the side away from the link member 244 mounting the transmission shaft 336, for rotation about the vertical axis 322.

The construction of a wrist assembly using a couple of the above-mentioned articulate mechanisms is now explained more particularly with reference to FIGS. 15 and 16. In this instance, the rear wrist mechanism 220*b* of FIG. 10 is mounted at the fore end of the arm 321 with drive motors M1 and M2, and the fore wrist mechanism 220*a* of FIG. 14 is connected to the rear wrist mechanism 220*b* by the link members 244. The second transmission shaft 336 and the first transmission shaft 249 of the rear articulate mechanism 220*b* are connected parallel with the first and second drive shafts 234 and 236 of the fore articulate mechanism by the link members 244. The chain sprocket 251 mounted at the end of the second transmission shaft of the rear articulate mechanism 220*b* is linked by the chain 252 to the chain sprocket 227*a*' mounted on the first drive shaft 234 of the fore articulate mechanism 220*a*, while the chain sprocket 253 mounted at the end of the first transmission shaft 249 of the rear articulate mechanism 220*b* is linked by the chain 254 to the chain sprocket 227*b*' mounted on the second drive shaft 236 of the fore articulate mechanism 220*a*.

The motor M1 mounted on the arm 321 is linked to the first drive shaft 334 of the rear articulate mechanism 320*b* by the chain 228 lapped around the chain sprocket 255 on the first drive shaft 334 and the chain sprocket 227*a* on the output shaft of the motor M1. On the other hand, the motor M2 mounted on the arm 321 is linked to the second drive shaft 336 of the rear articulate mechanism 220*b* by the chain 229 lapped around the chain sprocket 256 mounted at the end of the second drive shaft 336 and the chain sprocket 227*b* mounted on the output shaft of the motor M2.

Upon rotating the motor M1 or M2, the wrist mechanism operates in the following manner. Firstly, if the chain 229 is driven by the motor M2 to rotate the second drive shaft 336 at high speed, its rotation is transferred to the second transmission shaft 336 through the bevel gears 337 and 338 of the second rotation transmission means shown in FIG. 19, rotating the second transmission 336 at high speed. At the same time, the rotation is transmitted to the first drive shaft 334 of the fore articulate mechanism 220*a* through the chain sprocket 251, chain 252 and chain sprocket 227*a*'.

In this manner, the high-speed rotation of the second transmission shaft 336 of the rear articulate mechanism 220*b* is transmitted through the second reducer 334 to the link member 244 which is connected to the second reducer 334, causing the link member 244 to swing about the axis 322 in the direction of $\alpha 11$ as shown in FIG. 16(*b*). On the other hand, the rotation of the first drive shaft 234 of the fore articulate mechanism 220*a* of FIG. 14 is transmitted to the articulate member 223 after speed reduction through the first reducer 242, swinging the articulate member 223 and the driven articulate element 225 about the axis 222 in the direction of $\alpha 12$ as shown in FIG. 16(*b*). Consequently, the driven articulate element 225 is swung by the rotation of the motor M2 through the angle $\alpha 1$ which is the sum of the pivoting angles $\alpha 11$ and $\alpha 12$. Since this pivoting motion consists of the pivoting motions $\alpha 11$ and $\alpha 12$ by the rear and fore articulate mechanisms 220*b* and 220*a*, it can be effected very smoothly.

Upon actuating the motor M1, its rotation is transmitted to the first transmission shaft 249 through the bevel gears 247 and 248 of the first rotation transfer means, and then to the second drive shaft 236 of the fore articulate mechanism 220*a* of FIG. 14 through the chain sprocket 253, chain 254 and chain sprocket 227*b*'. Thence, the rotation is transmitted to the second transmission shaft 249 through the bevel gears 237 and 238 which constitute the second rotation transfer means of the fore articulate mechanism 220*a*. Consequently, the first drive shaft 334 of the rear articulate mechanism 220*b* and the second transmission shaft 239 of the fore articulate mechanism 220*a* are rotated at high speed.

If the first drive shaft 334 of the rear articulate mechanism 220*b* of FIG. 19 is put in high speed rotation, it is transmitted to the articulate member 323 through the first reducer mounted on the bifurcated portion 321*b* to swing the articulate member 323 about the axis 324. The link member 244 which acts as a sort of driven articulate element relative to the rear articulate mechanism 220*b* is attached to the articulate member 323 through the bearing 341, so that the link member 244 is swung in the direction of $\alpha 21$ in FIG. 15(*b*) by rotation of the articulate member 323.

The high speed rotation of the second transmission shaft 239 of the fore articulate mechanism 220*a* of FIG. 14 is transmitted to the driven articulate element 225 at the distal end of the wrist through the second reducer 243, swinging the driven articulate element 225 in the direction of $\alpha 22$ in FIG. 15(*b*) about the axis 224 which is disposed parallel with the axis 224. As a result, the second driven articulate element 225 is swung through an angle $\alpha 2$ relative to the center line of the arm 321, that is to say, through an angle corresponding to the pivoting angles $\alpha 21$ and $\alpha 22$ of the rear and fore articulate mechanisms 220*b* and 220*a*.

Figure 20:
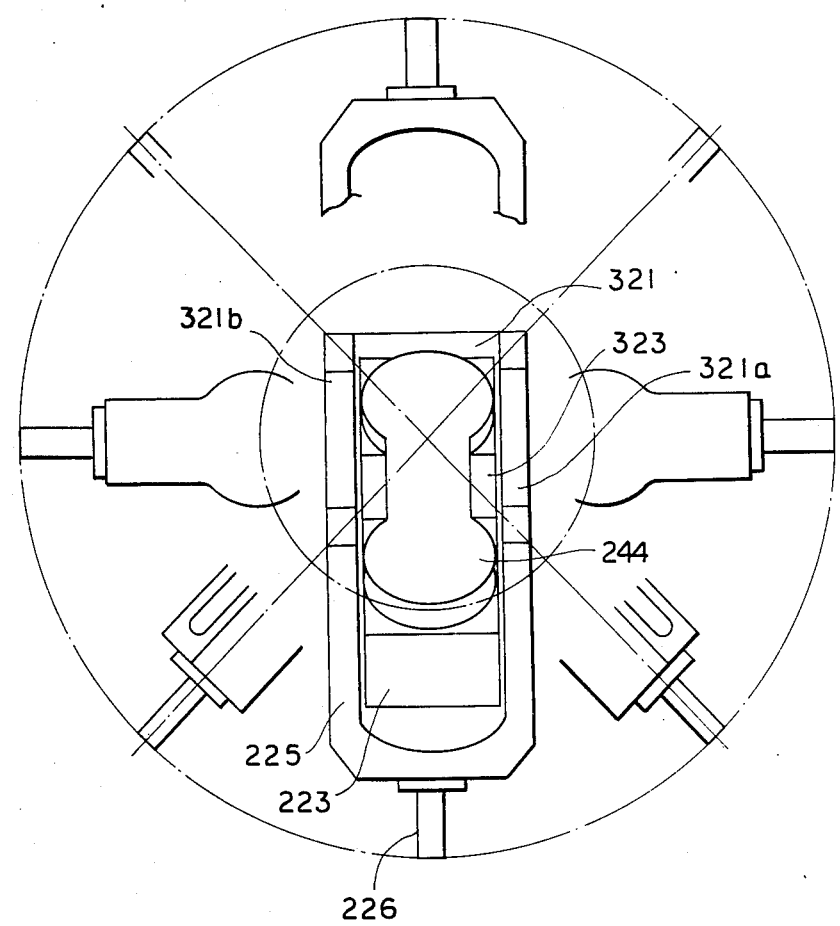
FIG. 20 is a view explanatory of the flexing motions of the wrist end as seen in the direction of arrow D in FIG. 15(a).

It will be understood from the foregoing description that, by rotating the motors M1 and M1 simultaneously or separately, the driven articulate element 225 at the distal end of a wrist assembly, which incorporates the above-described articulate mechanism at one or more flexible joints, can be swung in any direction to take an arbitrary posture. FIG. 20 illustrate the various postures taken by the wrist portion as seen in the direction of arrow D of FIGS. 15 and 16. In this case, the driven articulate element 225 is not rotated about its axis 225*a* (see FIGS. 13, 15 and 16), so that there is no possibility of the cable or hose which is connected to the driven articulate element being entangled about the wrist portion.

Although one or two articulate mechanisms are incorporated in the wrist assembly shown in FIGS. 13 to 16, it is possible to provide a smooth triple-articulate wrist assembly by further adding an articulate mechanism similar to the rear articulate mechanism 220*b*. Moreover, the articulate mechanism of the invention has been described and shown by way of the wrist portion of a robot, but it is to be understood that the mechanism of the invention is also applicable to other articulate portions of a robot in a similar fashion.

It will be appreciated from the foregoing description that, when flexing the wrist or articulate mechanism of the present invention, high-speed rotation is transmitted to the reducer which is incorporated at the end of the path of power transmission to rotate or flex the driven part of the mechanism at a reduced speed, so that the vibrations caused by irregularities in rotational movement or flexural distortions of the chains, gears or shafts as well as errors due to the plays of the component parts which are located before the reducer in the path of power transmission are transferred to the driven part in a reduced scale according to the ratio of speed reduction of the reducer, enhancing the accuracy of the rotational or flexing angle of the wrist or articulate mechanism, and thus improving the positioning accuracy of the distal end of the wrist or other articulate portion of the robot.

What is claimed as new and desired to be secured by Letters Patent of the United States is:

1. A flexible wrist mechanism for an industrial robot, said flexible wrist mechanism comprising:
   (a) a base member;
   (b) a first wrist element having a proximal and and a distal end, the proximal end of said first wrist element comprising a hollow rotational drive shaft journaled in said base member;
   (c) a second wrist element having a proximal end and a distal end, the proximal end of said second wrist element being disposed adjacent to the distal end of said first wrist element;
   (d) a first motor for driving a first motor shaft for imparting rotational movement to the wrist mechanism;
   (e) a second motor for driving a second motor shaft for imparting a flexing movement to the wrist mechanism;
   (f) a transmission shaft coaxially disposed within said hollow rotational drive shaft, said transmission shaft being journaled in said hollow rotational drive shaft, said transmission shaft being operatively connected to said second motor shaft;
   (g) a first reducer means having a driving side and a driven side, the driving side of said first reducer means being operatively connected to said first motor shaft and the driven side of said first reducer means being operatively connected to said hollow rotational drive shaft such that rotation of said first motor shaft by said first motor causes rotation of said hollow rotational drive shaft and said first wrist element at a reduced speed;
   (h) a first coupling shaft journaled in the distal end of said first wrist element and in the proximal end of said second wrist element, whereby said second wrist element is swingable relative to said first wrist element through said first coupling shaft;
   (i) an intermediate shaft journaled in said first wrist element intermediate its proximal and distal ends, said intermediate shaft being operatively connected to said transmission shaft and to said first coupling shaft such that rotation of said transmission shaft by said second motor shaft causes said intermediate shaft to rotate and the rotation of said intermediate shaft causes said first coupling shaft to rotate;
   (j) a second reducer means having a driving side and a driven side, the driving side of said second reducer means being operatively connected to said first coupling shaft and the driven side of said second reducer means being operatively connected to said second wrist element such that rotation of said first coupling shaft by said intermediate shaft causes said second wrist element to pivot at a slower angular speed than said intermediate shaft rotates;
   (k) a third wrist element having a proximal end and a distal end, the proximal end of said third wrist element being disposed adjacent to the distal end of said second wrist element;
   (l) a second coupling shaft journaled in the distal end of said second wrist element and the proximal end of said third wrist element, whereby said third wrist element is swingable relative to said second wrist element through said second coupling shaft;
   (m) first means for rotating said second coupling shaft at the same angular speed as said first coupling shaft; and
   (n) a third reducer means having a driving side and a driven side, the driving side of said third reducer means being operatively connected to said second coupling shaft and the driven side of said third reducer means being operatively connected to said third wrist element such the rotation of said second coupling shaft by said first means causes said third wrist element to pivot at the same angular speed as said second wrist element.

2. A flexible wrist mechanism as recited in claim 1 wherein said first reducer means is a harmonic drive reducer.

3. A flexible wrist mechanism as recited in claim 1 wherein said second reducer means is a harmonic drive reducer.

4. A flexible wrist mechanism as recited in claim 1 wherein said first coupling shaft is perpendicular to said transmission shaft.

5. A flexible wrist mechanism as recited in claim 1 wherein said first coupling shaft is operatively connected to said intermediate shaft by means which cause said first coupling shaft to rotate in synchronism with said intermediate shaft.

6. A flexible wrist mechanism as recited in claim 1 wherein said first means for rotating said second coupling shaft in response to rotation of said first coupling shaft causes said second coupling shaft to rotate in synchronism with said first coupling shaft.

7. A flexible wrist mechanism as recited in claim 1 wherein said third reducer means is a harmonic driver reducer.

8. A flexible wrist mechanism as recited in claim 1 wherein said second coupling shaft is perpendicular to said transmission shaft.

9. A flexible wrist mechanism as recited in claim 1 and further comprising:
   (a) a fourth wrist element having a proximal end and a distal end, the proximal end of said fourth wrist element being disposed adjacent to the distal end of said third wrist element;
   (b) a third coupling shaft journaled in the distal end of said third wrist element and the proximal end of said fourth wrist element, whereby said fourth wrist element is swingable relative to said third wrist element through said third coupling shaft;
   (c) second means for rotating said third coupling shaft in response to rotation of said second coupling shaft; and
   (d) a fourth reducer means having a driving side and a driven side, the driving side of said fourth reducer means being operatively connected to said third coupling shaft and the driven side of said fourth reducer means being operatively connected to said fourth wrist element such that rotation of said second coupling shaft by said second motor causes said third coupling shaft to rotate and rotation of said third coupling shaft is in turn transmitted to said fourth wrist element through said fourth reducer means, causing said fourth wrist element to flex relative to said third wrist element.

10. A flexible wrist mechanism as recited in claim 9 wherein said second means for rotating said third coupling shaft in response to rotation of said second coupling shaft causes said third coupling shaft to rotate in synchronism with said second coupling shaft.

11. A flexible wrist mechanism as recited in claim 9 wherein said fourth reducer means is a harmonic drive reducer.

12. A flexible wrist mechanism as recited in claim 9 wherein said third coupling shaft is perpendicular to said transmission shaft.

13. A flexible wrist mechanism as recited in claim 9 and further comprising a tool mounted on the distal end of said fourth wrist element.

14. An industrial robot comprising:
(a) at least one arm;
(b) a first wrist element having a proximal end and a distal end, the proximal end of said first wrist element comprising a hollow rotational drive shaft journaled in said at least one arm;
(c) a second wrist element having a proximal end and a distal end, the proximal end of said second wrist element being disposed adjacent to the distal end of said first wrist element;
(d) a first motor for imparting rotational movement to said first wrist element;
(e) a second motor for imparting flexing movement to said second wrist element;
(f) a transmission shaft coaxially disposed within said hollow rotational drive shaft, said transmission shaft journaled in said hollow rotational drive shaft, said transmission shaft being operatively connected to said second motor;
(g) a first reducer means having a driving side and a driven side, the driving side of said first reducer means being operatively connected to said first motor and the driven side of said first reducer means being operatively connected to said hollow rotational drive shaft such that rotation of said first motor causes rotation of said hollow rotational drive shaft and said first wrist element at a reduced speed;
(h) a first coupling shaft journaled in the distal end of said first wrist element and in the proximal end of said second wrist element, whereby said second wrist element is swingable relative to said first wrist element through said first coupling shaft;
(i) an intermediate shaft journaled in said first wrist element intermediate its proximal and distal ends, said intermediate shaft being operatively connected to said transmission shaft and to said first coupling shaft such that rotation of said transmission shaft by said second motor shaft causes said intermediate shaft to rotate and the rotation of said intermediate shaft causes said first coupling shaft to rotate;
(j) a second reducer means having a driving side and a driven side, the driving side of said second reducer means being operatively connected to said first coupling shaft and the driven side of said second reducer means being operatively connected to said second wrist element such that rotation of said first coupling shaft by said intermediate shaft causes said second wrist element to pivot at a slower angular speed than said intermediate shaft rotates;
(k) a third wrist element having a proximal end and a distal end, the proximal end of said third wrist element being disposed adjacent to the distal end of said second wrist element;
(l) a second coupling shaft journaled in the distal end of said second wrist element and the proximal end of said wrist element, whereby said third wrist element is swingable relative to said second wrist element through said second coupling shaft;
(m) first means for rotating said second coupling shaft at the same angular speed as said first coupling shaft; and
(n) a third reducer means having a driving side and a driven side, the driving side of said third reducer means being operatively connected to said second coupling shaft and the driven side of said third reducer means being operatively connected to said third wrist element such the rotation of said second coupling shaft by said first means causes said third wrist element to pivot at the same angular speed as said second wrist element.

15. A flexible wrist mechanism for an industrial robot, said flexible wrist mechanism comprising:
(a) a base member;
(b) a first wrist element having a proximal end and a distal end, the proximal end of said first wrist element comprising a hollow rotational drive shaft journaled in said base member;
(c) a second wrist element having a proximal end and a distal end, the proximal end of said second wrist element being disposed adjacent to the distal end of said first wrist element;
(d) a first motor for imparting rotational movement to the wrist mechanism;
(e) a second motor for imparting flexing movement to the wrist mechanism;
(f) a transmission shaft coaxially disposed within said rotational drive shaft, said transmission shaft being journaled in said hollow rotational drive shaft, said transmission shaft being operatively connected to said second motor;
(g) a first reducer means having a driving side and a driven side, the driving side of said first reducer means being operatively connected to said first motor and the driven side of said first reducer means being operatively connected to said hollow rotational drive shaft such that rotation of said first motor causes rotation of said hollow rotational drive shaft and said first element at a reduced speed;
(h) a first coupling shaft journaled in the distal end of said first wrist element and in the proximal end of said second wrist element, whereby said second wrist element is swingable relative to said first wrist element through said first coupling shaft;
(i) an intermediate shaft journaled in said first wrist element intermediate its proximal and distal ends, said intermediate shaft being operatively connected to said transmission shaft and to said first coupling shaft such that rotation of said transmission shaft by said second motor shaft causes said intermediate shaft to rotate and the rotation of said intermediate shaft causes said first coupling shaft to rotate;
(j) a second reducer means having a driving side and a driven side, the driving side of said second reducer means being operatively connected to said first coupling shaft and the driven side of said second reducer means being operatively connected to said second wrist element such that rotation of said first coupling shaft by said intermediate shaft causes said second wrist element to pivot at a slower angular speed than said intermediate shaft rotates;

(k) a third wrist element having a proximal end and a distal end, the proximal end of said third wrist element being disposed adjacent to the distal end of said second wrist element;

(l) a second coupling shaft journaled in the distal end of said second wrist element and the proximal end of said third wrist element, whereby said second wrist element through said second coupling shaft;

(m) first means for rotating said second coupling shaft at the same angular speed as said first coupling shaft; and (n) a third reducer means having a driving side and a driven side, the driving side of said third reducer means being operatively connected to said second coupling shaft and the driven side of said third reducer means being operatively connected to said third wrist element such the rotation of said second coupling shaft by said first means causes said third wrist element to pivot at the same angular speed as said second wrist element.

16. A flexible wrist mechanism for an industrial robot, said flexible wrist mechanism comprising:

(a) a base member;

(b) a first wrist element having a proximal end and a distal end, the proximal end of said first wrist element comprising a hollow rotational drive shaft journaled in said base member;

(c) a second wrist element having a proximal end and a distal end, the proximal end of said second wrist element being disposed adjacent to the distal end of said first wrist element;

(d) a first motor for driving a first motor shaft for imparting rotational movement to the wrist mechanism;

(e) a second motor for driving a second motor shaft for imparting flexing movement to the wrist mechanism;

(f) a transmission shaft coaxially disposed within said hollow rotational drive shaft, said transmission shaft being journaled in said hollow rotational drive shaft, said transmission shaft being operatively connected to said second motor shaft;

(g) a first reducer means having a driving side and a driven side, the driving side of said first reducer means being operatively connected to said first motor shaft and the driven side of said first reducer means being operatively connected to said hollow rotational drive shaft such that rotation of said first motor shaft by said first motor causes rotation of said hollow rotational drive shaft and said first wrist element at a reduced speed;

(h) a first coupling shaft journaled in the distal end of said first wrist element and in the proximal end of said second wrist element, whereby said second wrist element is swingable relative to said first wrist element through said first coupling shaft;

(i) an intermediate shaft journaled in said first wrist element intermediate its proximal and distal ends, said intermediate shaft being mechanically connected to said transmission shaft for rotation in synchronism therewith and being mechanically connected to said first coupling shaft for rotation in synchronism therewith such the rotation of said transmission shaft by said second motor shaft causes said first coupling shaft to rotate at the same angular speed as said transmission shaft and the rotation of said intermediate shaft causes said first coupling shaft to rotate at the same angular speed as said intermediate shaft;

(j) a second reducer means having a driving side and a driven side, the driving side of said second reducer means being operatively connected to said first coupling shaft and the driven side of said second reducer means being operatively connected to said second wrist element;

(k) a third wrist element having a proximal end and a distal end, the proximal end of said third wrist element being disposed adjacent to the distal end of said second wrist element;

(l) a second coupling shaft journaled in the distal end of said second wrist element and the proximal end of said third wrist element, whereby said third wrist element is swingable relative to said second wrist element through said second coupling shaft;

(m) first means for rotating said second coupling shaft at the same angular speed as said first coupling shaft; and (n) a third reducer means having a driving side and a driven side, the driving side of said third reducer means being operatively connected to said second coupling shaft and the driven side of said third reducer means being operatively connected to said third wrist element such the rotation of said second coupling shaft by said first means causes said third wrist element to pivot at the same angular speed as said second wrist element.

17. A flexible wrist mechanism as recited in claim 1 wherein said first and second motors are mounted in said base member.

18. A flexible wrist mechanism as recited in claim 1 wherein said transmission shaft is also journaled in said base member.

19. An industrial robot as recited in claim 14 wherein said first and second motors are mounted in said base member.

20. An industrial robot as recited in claim 14 wherein said transmission shaft is also journaled in said base member.

21. A flexible wrist mechanism as recited in claim 15 wherein said first and second motors are mounted in said base member.

22. A flexible wrist mechanism as recited in claim 15 wherein said transmission shaft is also journaled in said base member.

23. A flexible wrist mechanism as recited in claim 16 wherein said first and second motors are mounted in said base member.

24. A flexible wrist mechanism as recited in claim 16 wherein said transmission shaft is also journaled in said base member.

* * * * *